United States Patent [19]

Franzolini et al.

[11] Patent Number: 4,589,893

[45] Date of Patent: May 20, 1986

[54] STEAM SEPARATOR SUPERHEATER AND METHOD OF ASSEMBLY

[75] Inventors: Marc Franzolini, Chevry II; Jacques Marjollet, Paris, both of France

[73] Assignee: Stein Industrie, Velizy-Villacoublay, France

[21] Appl. No.: 661,846

[22] Filed: Oct. 17, 1984

[30] Foreign Application Priority Data

Oct. 19, 1983 [FR] France .................. 83 16629

[51] Int. Cl.$^4$ .............................................. B01D 53/26
[52] U.S. Cl. ........................................ 55/269; 55/440;
122/483; 414/746
[58] Field of Search .................. 55/269, 342, 343, 418,
55/440, 462; 122/476, 483, 491, 492; 414/746

[56] References Cited

U.S. PATENT DOCUMENTS

| | | | |
|---|---|---|---|
| 3,126,103 | 3/1964 | Postlewaite et al. | 414/746 |
| 3,257,001 | 6/1966 | Postlewaite et al. | 414/746 |
| 3,712,272 | 1/1973 | Carnaros et al. | 122/483 |
| 3,713,278 | 1/1973 | Miller et al. | 55/269 |

FOREIGN PATENT DOCUMENTS

| | | |
|---|---|---|
| 2116645 | 7/1972 | France . |
| 2224031 | 10/1974 | France . |
| 2346636 | 10/1977 | France . |

*Primary Examiner*—Charles Hart
*Attorney, Agent, or Firm*—Sughrue, Mion, Zinn, Macpeak, and Seas

[57] ABSTRACT

This steam separator superheater comprises a horizontal axis cylindrical shell (1) enclosing in its lower portion a steam and moisture separator and in its upper portion a two-stage steam superheater resting on running paths supported half way up the shell by a frame (5). Each stage of the steam superheater is constituted by two bundles of hair-pin bent tubes (15, 16 and 17, 18) supplied with superheat steam from steam chests (43, 44, 45, 46). The upper stage rests on the lower stage. Both stages are inserted into the shell via sleeves (47, 48) outside the shell and extending loading openings made through an end plate (2) of the shell. The upper stage is lifted into position by lifting gear outside the shell (1) acting by means of lifting lines passing through passages (49) in the shell. The passages are closed by caps (51) when the separator superheater is in use.

3 Claims, 7 Drawing Figures

STEAM SEPARATOR SUPERHEATER AND METHOD OF ASSEMBLY The present invention relates to a horizontal axis separator superheater intended for drying and reheating steam as it passes from a high pressure expansion chamber to a low pressure expansion chamber in a high power steam turbine.

BACKGROUND OF THE INVENTION

This type of separator superheater comprises a cylindrical shell which rests horizontally on two supports placed near to its ends and which encloses a steam and moisture separator in its lower portion and a steam superheater in its upper portion. The steam and moisture separator is generally constituted by a set of baffle plates. The steam to be processed passes through the baffles on arriving in the separator superheater. The baffles are mounted on a frame which is supported by the shell and which also serve to support the steam superheater. The steam superheater is constituted by one or more heat exchangers which are generally formed by means of hair-pin bend tubes placed on the path of the steam to be processed at the outlet from the steam and moisture separator. The bent tubes are fed with heating steam from a steam chest or steam header which is fixed to the set of tubes by means of a perforated plate or tube sheet and which encloses a heating steam admission chamber and a condensate exhaust chamber connected respectively to a steam inlet duct and to a condensate outlet duct.

If the separator superheater is very heavy, more than about one hundred tons, the steam superheater must be assembled on site and must therefore be capable of being inserted into the shell without requiring major or difficult welding operations to be performed thereon such as welding on a cover covering the full cross section of the shell. In order to do this, some prior art separator superheaters include a running path of rollers on the frame which is to support the steam superheater, thereby enabling the steam superheater to slide longitudinally into the tubular shell. One of the ends of the shell is also fitted with a flanged cover extending over its entire section in order to enable the steam superheater to be inserted therein. In order to avoid the extra cost involved by a large size flanged cover, some prior art separator superheaters have even had end covers welded to the shell in the factory, with one of the end covers being fitted with a loading hatch in line with the running path. The loading hatch is fitted with an external sleeve via which the set of steam superheater tubes is inserted. Once in place, the steam chest thereof projects beyond the sleeve and is welded thereto around its periphery.

Since the cross section of the steam chest is much less than that of the shell, the welding is much easier to perform and especially to test than the welding of the end cover to the shell. In order to reduce the cross section of the sleeve and to improve the filling factor of the internal volume of the shell, it is possible to split the steam superheater into two identical portions placed side by side and inserted into the shell via two separate sleeves.

For some high power turbines, it has appeared to be advantageous to use separator superheaters having two superheater stages. This gives rise to assembly problem for the two steam superheat stages since, for reasons of convenience in providing external connections and for reasons of ensuring a high filling factor of the internal volume of the shell, the two stages need to have their steam chests at opposite ends of the shell while still being inserted from the same end so that room to maneuver need only be provided at one end of the shell on site.

Preferred embodiments of the present invention solve this problem while still enabling on-site assembly of steam superheaters in the shell, and consequently making disassembly possible, if required, without damaging the integrity of the shell and without fitting a flanged cover to the end thereof.

SUMMARY OF THE INVENTION

The present invention provides a steam separator superheater comprising a horizontal axis cylindrical shell enclosing in its lower portion a steam and moisture separator mounted on a frame and in its upper portion a steam superheater resting on at least one running path supported parallel to the horizontal axis of the shell by the frame. The steam superheater comprises two stages: a lower stage; and an upper stage. Each stage comprises at least one bundle of hair-pin bent tubes extending over the major portion of the length of the cylindrical shell, and a steam header which is fixed to a tube sheet at one of the ends of each bundle to which chest various heating steam admission and condensate evacuation ducts are connected. In this steam separator superheater a bundle of tubes of the upper stage of the steam superheater together with its steam header occupies a cross section not greater than that of the bundle of tubes placed below together with its own steam chest and belonging to the lower stage of the steam superheater. The cylindrical shell of the steam separator superheater is fitted at one end with at least one loading orifice aligned with a running path and extending outside the shell in the form of a sleeve. The orifice allows any of the said bundles of tubes to be inserted onto the running path. Passages are made through the upper wall of the shell and are provided with external tubes that are closable by caps and which enable lifting lines to be passed through the shell to permit lifting gear outside the shell to lift a bundle of tubes together with its steam header of the upper stage of the steam superheater previously inserted into the shell via a loading opening and on a running path.

In a preferred embodiment, the lifting lines are fitted with stop means (washers, nuts) enabling the upper steam superheat stage to be suspended from the external tubes once it has been lifted into place and prior to the lower steam superheat stage being inserted into the shell.

The present invention also provides methods of assembling the above-defined steam separator superheater.

BRIEF DESCRIPTION OF THE DRAWINGS

An embodiment of the invention is described by way of example with reference to the accompanying drawings, in which.

MORE DETAILED DESCRIPTION

Figure 1:
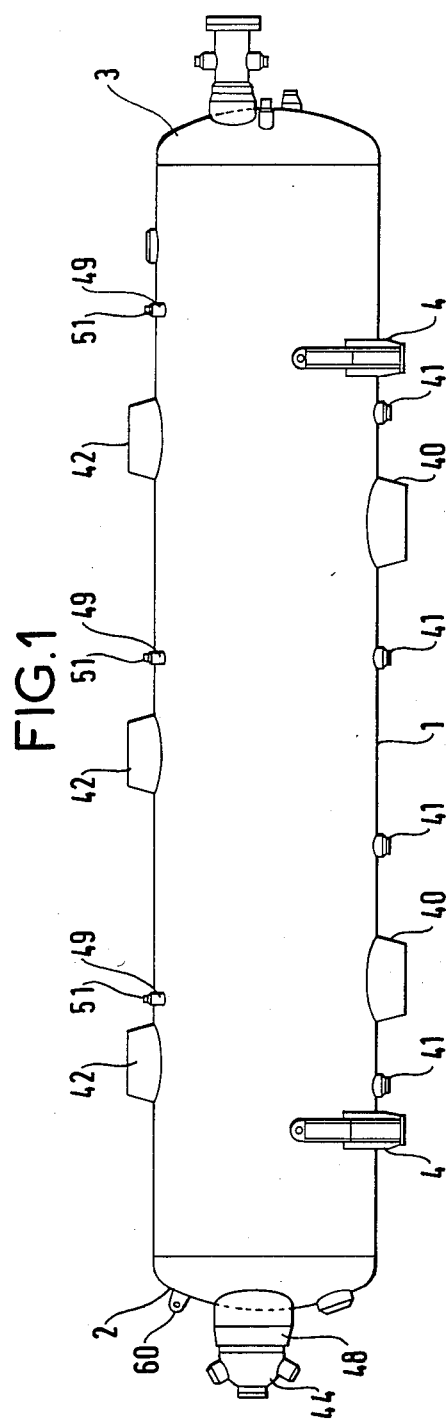
FIG. 1 is a longitudinal exterior view of a steam separator superheater in accordance with the invention.
Figure 3:
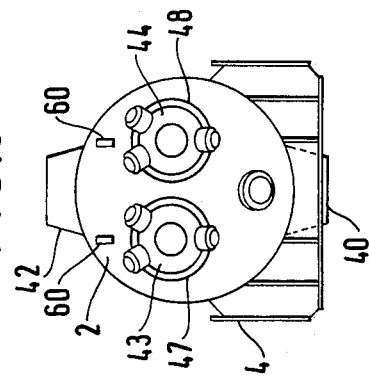
FIGS. 2 and 3 are end views of the cylindrical shell of the steam separator superheater shown in FIG. 1.
Figure 2:
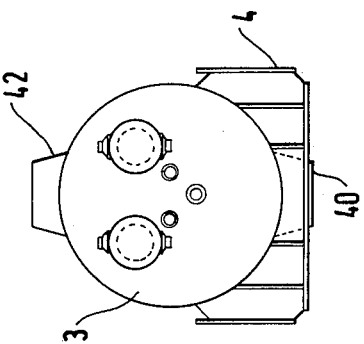
Figure 4:
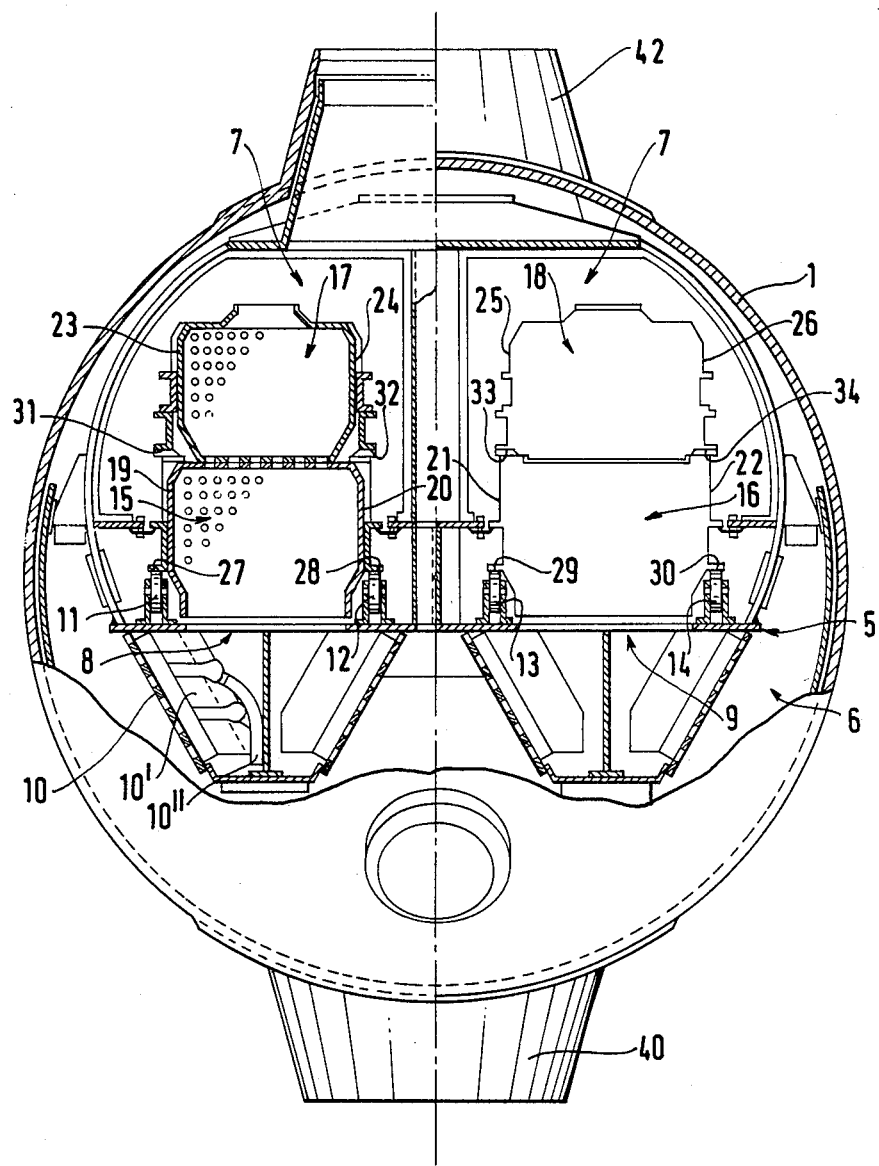
FIG. 4 is a cross section view of the steam separator superheater shown in FIG. 1.

The steam separator superheater shown in FIGS. 1 to 4 comprises a large size cylindrical shell 1 closed by two welded end plates 2 and 3 and placed horizontally on cradles 4. The shell 1 encloses a frame 5 which divides it horizontally into two chambers: a lower chamber 6 for admission of steam to be processed; and an upper chamber 7 for removal of steam; said chambers being in communication via two wide horizontal slots 8 and 9 extending side by side over the major portion of the length of the shell. The lower chamber 6 is occupied by a baffle plate steam and moisture separator in the form of two identical elements mounted side-by-side on the frame 5 and disposed longitudinally under the communication slots 8 and 9. The upper chamber 7 is occupied by a two-stage superheater likewise in the form of two identical elements mounted side-by-side on the frame 5.

The steam and moisture separator is constituted by perforated plates 10 with baffle separators 10' and moisture runoff ducts 10" mounted at an angle on the frame 5 and disposed in the lower chamber 6 as two identical assemblies in the form of elongate hoppers channelling the steam to be processed towards the communication slots 8 and 9.

The two stage steam superheater is supported in the upper chamber 7 on rollers 11, 12 and 13, 14 mounted on the frame 5 on either side of the communication slots 8 and 9 defining running paths. The two stages placed one above the other are constituted by two identical heat exchangers comprising hair-pin bent tubes placed side by side over the communication slots 8 and 9. Each bundle of tubes 15, 16, 17, 18 is held by a frame between two solid side walls 19, 20, 21, 22, 23, 24, 25, 26 which extend the sides of the communication slots and channel the steam to be superheated towards the external surfaces of the tubes. The side walls have longitudinally extending support flanges 27, 28, 29, 30, 31, 32, 33, 34 for the running path rollers 11, 12, 13, and 14.

The steam to be processed, coming for example from a high pressure expansion stage of a turbine, is inserted into the lower admission chamber 6 of the shell 1 via two orifices 40 located on the bottom generator line of the shell 1 between liquid bleeder orifices 41. On entering the lower portion of the shell 6, the steam is initially dried by means of deflector plates facing the orifices 40 and fitted with gutters which deflector plates collect bursts of liquid and large drops and also distribute the steam over the bottom of the lower chamber 6. The steam then moves towards the upper chamber 7 of the shell 1 by passing through the perforated plates 10 to the baffles 10' of the steam and moisture separator where the major part of the moisture suspended in the steam is removed therefrom. The steam then passes through the communication slots 8 and 9, moves between the tubes of the bundles 15 and 16 of the first superheat stage, and then between the bundles 17 and 18 of the second superheat stage before emerging into the upper chamber 7 of the shell 1 and being removed therefrom both dried and superheated via three orifices 42 distributed along the top generator line of the shell 1.

Each of the four heat exchanger bundles of tubes 15, 16, 17 and 18 constituting the two stage steam superheater is fed with heating steam by a steam chest or steam header 43, 44, 45, 46 fixed to one of its ends by a perforated plate or tube sheet and connected to various ducts for feeding heating steam and for removing condensates.

The steam chests 43, 44 of the lower stage steam superheaters have a cylindrical transverse profile which is slightly larger than the profile of the steam chests 45, 46 of the upper stage. The lower stage steam chests are located outside the shell 1 in extensions of sleeves 47, 48 located side-by-side in the end plate 2. This arrangement enables the first stage steam superheaters to be inserted into the shell 1 by inserting them through the sleeves 47 and 48 and by making them slide along the running path rollers 11 to 14. The shell is sealed by welding the sleeves 47, 48 to the perimeters of the steam chests 43 and 44. The various ducts coming from outside the shell 1 and leading to the steam chests 43 and 44 thus do not need to pass individually through the end plate 2. This arrangement also has the advantage of obtaining sealing at the end of assembly by welding around small diameter sleeves capable of being tested on site and not putting the entire shell 1 to the test.

The steam chests 45 and 46 of the upper stage of the steam superheater are mounted inside the shell 1 the other way round from the steam chests 43, 44 of the lower stage in order to spread the heater steam ducts out over both of the end plates 2 and 3 of the shell 1 and to facilitate making connections. Their passages through the end plate 3 are not shown in detail. They are provided in conventional manner using expansion sleeve and forks for absorbing relative displacements between the bundles and the shell 1 due to various thermal stresses.

The upper stage of the steam superheater simply rests on the lower stage. The steam chests 45, 46 and the bundles of tubes 17, 18 of the two heat exchangers are of smaller cross section than the steam chests 43, 44 and the bundles of tubes 15 and 16 of the two lower stage heat exchangers, and are thus capable of being inserted into the shell 1 via the sleeves 47 and 48 before the lower stage heat exchangers are inserted. The shell 1 is provided with passages 49 through its upper wall, vertically above the heat exchangers, thereby enabling the heat exchangers of the upper steam superheat stage, once they have been inserted into the shell 1 on the running path rollers 11, 12, 13, and 14, to be lifted to their final positions by means of lifting gear located outside the shell 1. The passages 49 are extended outside the shell 1 by outer tubes which can be closed by caps 51. The outer tubes and the caps 51 are assembled to one another either by means of flanges which are bolted together or else by welding, given that their small size makes it possible to perform local tests on the welds without putting the entire shell 1 to the test. Anchor points 60 fixed to the outside of the shell 1 serve to hold a lifting beam 56 rigidly in position for use in inserting the superheaters into the shell.

FIGS. 5 to 8 show the various stages in on-site assembly of the steam superheater inside the shell.

Figure 5:
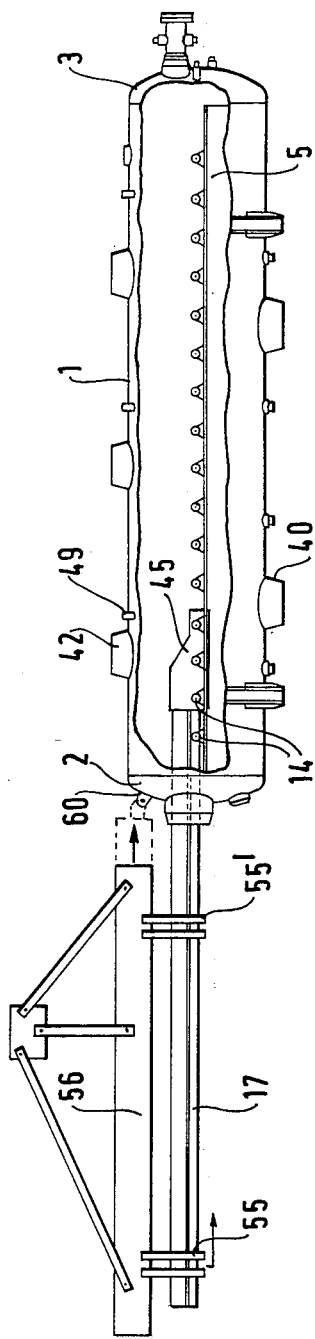
FIGS. 5, 6 and 7 are longitudinal views of the steam separator superheater shown in the previous figures during assembly.

FIG. 5 shows a first stage in the assembly. The shell 1 is in position on site and encloses the frame 5 with the steam and moisture separator mounted on its lower portion and with the roller running paths 11, 12, and 13, 14 in place ready to receive the steam superheat exchangers. A heat exchanger of the upper superheat stage, eg. 17, is hanging ouside the shell 1 in slings 55 and 55' which are fitted at their upper ends with rollers running in support tracks on a lifting beam 56 which is itself hooked to lifting means. The heat exchanger is aligned with one of the sleeves (47 in this case) with its steam chest 43 pointing towards the sleeve. Initially it is inserted by moving the beam 56, the slings 55 and 55' and the bundle of tubes 17 as a unit, until the end of the heat exchanger rests on the running path rollers 14.

The beam 56 is then rigidly fixed to the anchor points 60, the sling 55' is released, and the bundle 17 is inserted by translation along the running path 14, with the sling 55 moving along the beam 56 by means of its rollers.

Figure 6:
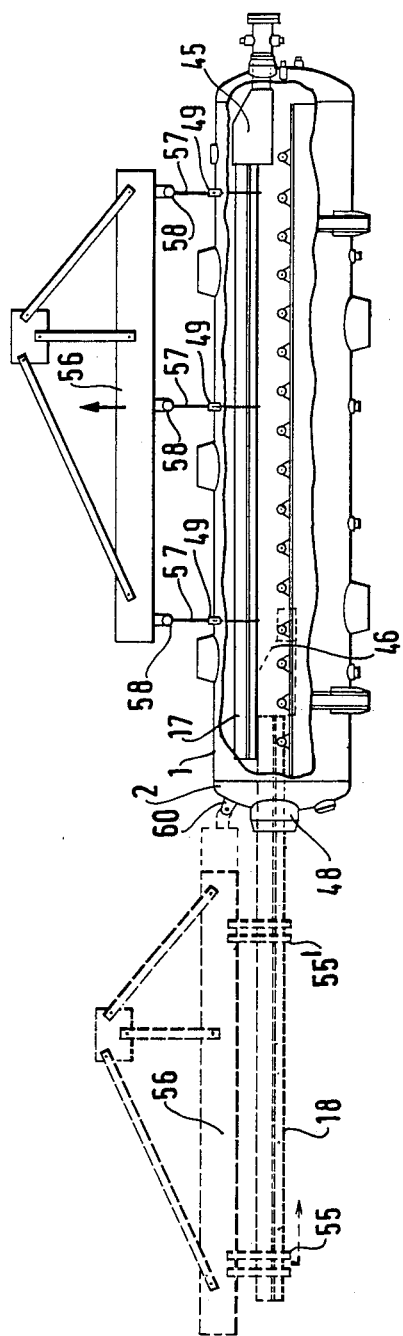

FIG. 6 shows the second and third assembly stages, during which the second heat exchanger of the upper stage of the steam superheater (18 in the present example) is inserted into the shell 1 via the other sleeve 38 in the same way as the first, and wherein both of the heat exchangers 17, 18 of the upper stage of the steam superheater are lifted to their final positions inside the shell 1 from the running paths 11, 12 and 13, 14 on which they were resting by means of the lifting gear which is brought over the shell 1 and which makes use of lines 57 hanging from the beam 56 by means of rocker arms 58 and inserted into the shell 1 via the passages 49.

Figure 7:
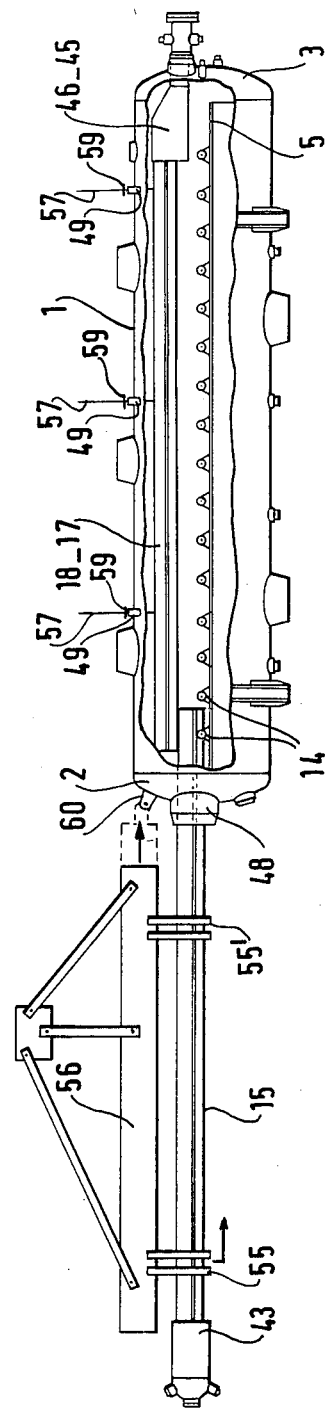

FIG. 7 shows the last two assembly stages, in which the two upper stage heat exchagers 17 and 18 of the steam superheater are hanging in their final positions from the tubes 49 through the shell 1 by means of the lines 57 which are fitted with stop means 59 (washers, nuts) thereby releasing the lifting means for use in inserting the two heat exchangers 15 and 16 of the lower stage of the steam superheater. The first of these heat exchangers, eg. 15, is suspended from the beam 56 by means of the slings 55, 55' and is disposed in alignment with the sleeve 47, its steam chest 43 pointing away therefrom. It is ready to be pushed into the shell 1 in the same way as the preceding bundles of tubes.

The second heat exchanger 16 of the lower stage of the steam superheater is then inserted into the shell via the other sleeve 48, the heat exchangers of the upper stages are then allowed to rest on the heat exchangers of the lower stage, the various ducts are connected up, the sleeves 47, 48 are welded to the peripheries of the steam chests 43, 44 of the lower stage of the steam superheater, and the passages 49 are closed by means of their caps 51.

For disassembly, the order of operations described above should be reversed and the welds should be ground apart. It is then possible to replace elements of the steam superheater without affecting the integrity of the shell.

We claim:

1. A steam separator superheater comprising:
a horizontal axis cylindrical shell,
a frame within said shell separating said shell interior into an upper portion and a lower portion,
a steam and moisture separator mounted on said frame in said lower portion,
means defining at least one running path within said upper portion,
a steam superheater resting on said means defining at least one running path supported parallel to the horizontal axis of the shell by said frame,
the superheater comprising two stages, a lower stage and an upper stage, each stage comprising at least one bundle of hair-pin bent tubes extending over the major portion of the length of the cylindrical shell, and a steam header which is fixed to a tube sheet at one of the ends of each bundle,
various heating steam admission and condensate evacuation ducts connected to said steam headers,
a bundle of tubes of the upper stage of the steam superheater together with its steam header occupying a cross section not greater than that of the bundle of tubes of the lower stage of the steam superheater, together with its own steam header placed below the upper stage of the steam superheater,
the cylindrical shell being closed by end plate including at least one loading orifice aligned with said running path and a sleeve extending outside of the shell surrounding said orifice to enable insertion into the shell along the corresponding running path, said bundles of tubes in sequence, and passages through the upper wall of the shell provided with external tubes that are closable by caps which enable lifting lines to passed through the shell to permit lifting gear outside the shell to lift the bundle of tubes of the upper stage of the steam superheater with its steam header after it has been inserted into the shell via a loading opening and on a running path out of the way of said bundle of tubes and its steam header of the lower stage of said steam superheater subsequently inserted into the shell on the same running path.

2. A separator superheater according to claim 1, wherein the cylindrical shell is provided with external anchor points for holding a lifting beam in position for serving to insert said bundles of tubes into the shell by sliding them through said sleeve.

3. A separator superheater according to claim 1, having two superheat stages each comprising two bundles of tubes disposed side-by-side, and wherein the separator superheater includes two bundle loading orifices located side-by-side and extending through one of the end plates in line with dual running paths on which the bundles of tubes of the lower stage of the steam superheater stand, and said superheater further includes two sleeves welded around the periphery of the steam headers thereof and aligned with the loading orifices.

* * * * *